United States Patent
Shekhar et al.

(10) Patent No.: US 10,853,323 B2
(45) Date of Patent: Dec. 1, 2020

(54) DEDUPLICATING EXTENTS ACROSS SYSTEMS BASED UPON INDICATIONS OF SHARED EXTENTS PROVIDED BY CLIENTS

(71) Applicant: NetApp, Inc., Sunnyvale, CA (US)

(72) Inventors: Sisir Shekhar, Bihar (IN); Akshatha Gangadharaiah, Bangalore (IN); Saravana Selvarai, Bangalore (IN)

(73) Assignee: NetApp Inc., Sunnyvale, CA (US)

( * ) Notice: Subject to any disclaimer, the term of this patent is extended or adjusted under 35 U.S.C. 154(b) by 593 days.

(21) Appl. No.: 14/807,806

(22) Filed: Jul. 23, 2015

(65) Prior Publication Data

US 2017/0024409 A1 Jan. 26, 2017

(51) Int. Cl.
*G06F 16/174* (2019.01)
*H04L 29/08* (2006.01)

(52) U.S. Cl.
CPC .......... *G06F 16/1748* (2019.01); *H04L 67/06* (2013.01); *H04L 67/1097* (2013.01)

(58) Field of Classification Search
CPC ......... G06F 17/30156; G06F 17/30203; G06F 17/30088; G06F 17/30115; G06F 17/30194; G06F 17/30371; G06F 17/30091; G06F 17/30174; G06F 17/30572; G06F 17/30575; G06F 17/30073; G06F 17/30132; G06F 17/30309; G06F 16/1748; H04L 67/1097; H04L 67/06
USPC ....................................................... 707/692
See application file for complete search history.

(56) References Cited

U.S. PATENT DOCUMENTS

| | | | | |
|---|---|---|---|---|
| 8,190,850 B1* | 5/2012 | Davenport | .............. | G06F 16/10 711/202 |
| 8,412,688 B1* | 4/2013 | Armangau | ............ | G06F 16/128 707/695 |
| 8,442,952 B1* | 5/2013 | Armangau | ........ | G06F 17/30159 706/14 |
| 8,639,658 B1* | 1/2014 | Kumaresan | ........... | G06F 3/0641 707/609 |
| 8,984,097 B1* | 3/2015 | Shyam | .................. | G06F 16/178 709/218 |
| 2007/0266062 A1* | 11/2007 | Young | ................. | G06F 11/1004 |
| 2010/0211548 A1* | 8/2010 | Ott | .................... | G06F 17/30575 707/655 |

(Continued)

OTHER PUBLICATIONS

NFS Version 4 Minor Version 2 draft-ietf-nfsv4-minorversion2-11.txt, May 23, 2012.*

(Continued)

*Primary Examiner* — Pierre M Vital
*Assistant Examiner* — Andalib F Lodhi
(74) *Attorney, Agent, or Firm* — Cooper Legal Group, LLC

(57) ABSTRACT

A client identifies a first data unit to be shared from a first file to a second file and sends an operation to copy that indicates the first data unit to be shared. The operation to copy the first data unit from the first file to the second file is received. In response to receiving the operation to copy the first data unit from the first file to the second file, it is determined whether the first data unit can be shared with the second file. In response to determining that the first data unit cannot be shared with the second file, the first data unit is copied to the second file. In response to determining that the first data unit can be shared with the second file, the first data unit is shared between the first file and the second file.

18 Claims, 6 Drawing Sheets

(56) References Cited

U.S. PATENT DOCUMENTS

| | | | |
|---|---|---|---|
| 2012/0047115 A1* | 2/2012 | Subramanya | G06F 17/30138 707/696 |
| 2013/0054530 A1* | 2/2013 | Baker | G06F 16/119 707/639 |
| 2013/0232121 A1* | 9/2013 | Tucker | G06F 16/176 707/655 |
| 2016/0063018 A1* | 3/2016 | Das | G06F 16/1752 707/822 |
| 2016/0203203 A1* | 7/2016 | Lord | G06F 16/1787 707/610 |

OTHER PUBLICATIONS

Eisler, "Requirements for NFSv4.2", https://tools.ietf.org/html/drafteislernfsv4minorversion2requirements02 as visited on May 25, 2015, Oct. 26, 2009, 20 pages.

Haynes, "NFS Version 4 Minor Version 2", https://tools.ietf.org/html/draftietfnfsv4minorversion211 as visited Jun. 8, 2015, May 23, 2012, 92 pages.

Lentini, et al., "Accelerating NFS With Server-Side Copy", https://www.usenix.org/legacy/event/fast11/posters_files/Lentini.pdf as visited May 25, 2015, Feb. 2011, 1 page.

Lentini, et al., "NFS Server-Side Copy", https://tools.ietf.org/html/draftlentininfsv4serversidecopy00 as visited Jun. 8, 2015, Mar. 31, 2009, 32 pages.

\* cited by examiner

DEDUPLICATING EXTENTS ACROSS SYSTEMS BASED UPON INDICATIONS OF SHARED EXTENTS PROVIDED BY CLIENTS

BACKGROUND

The disclosure generally relates to the field of storage systems, and more particularly to data deduplication.

Data deduplication is the process of eliminating duplicate copies of data. When data associated with two files is identical, deduplication occurs by freeing the duplicate data of one file and having the file reference the data of the other file. Once deduplicated, the files share the same source data. Deduplication may also occur at a finer granularity than file level. For example, data may be deduplicated at a block or extent level.

Deduplication occurs locally within a system, and as a result, deduplication information is typically not shared across systems. In a storage system context, a client performs its own deduplication, and a storage system separately performs its own deduplication. Because deduplication information is not shared, data that is deduplicated on a client system may not be deduplicated on a storage system.

OVERVIEW

To prevent duplication of data on a storage system, a client can indicate to the storage system when an extent local to the client is shared between files. Typically, a client tracks and maintains shared extents locally, so when an extent is created or backed up to a storage system, the client sends the extent data instead of indicating that the extent is shared with another file. As a result, the extent may not be shared between corresponding files on the storage system, resulting in duplicated data. The client can indicate a shared extent by sending a copy operation identifying a source file, destination file, and one or more extents to the storage system. The storage system identifies the extents indicated in the copy operation as being shared between the source and destination files instead of copying the extent.

This overview is a brief overview for the disclosure, and not a comprehensive overview. The purpose of this brief overview is to provide a compact explanation as a preview to the disclosure. This brief overview does not capture the entire disclosure or all aspects, and should not be used limit claim scope.

BRIEF DESCRIPTION OF THE DRAWINGS

Aspects of the disclosure may be better understood by referencing the accompanying drawings.

DESCRIPTION

Figure 1:
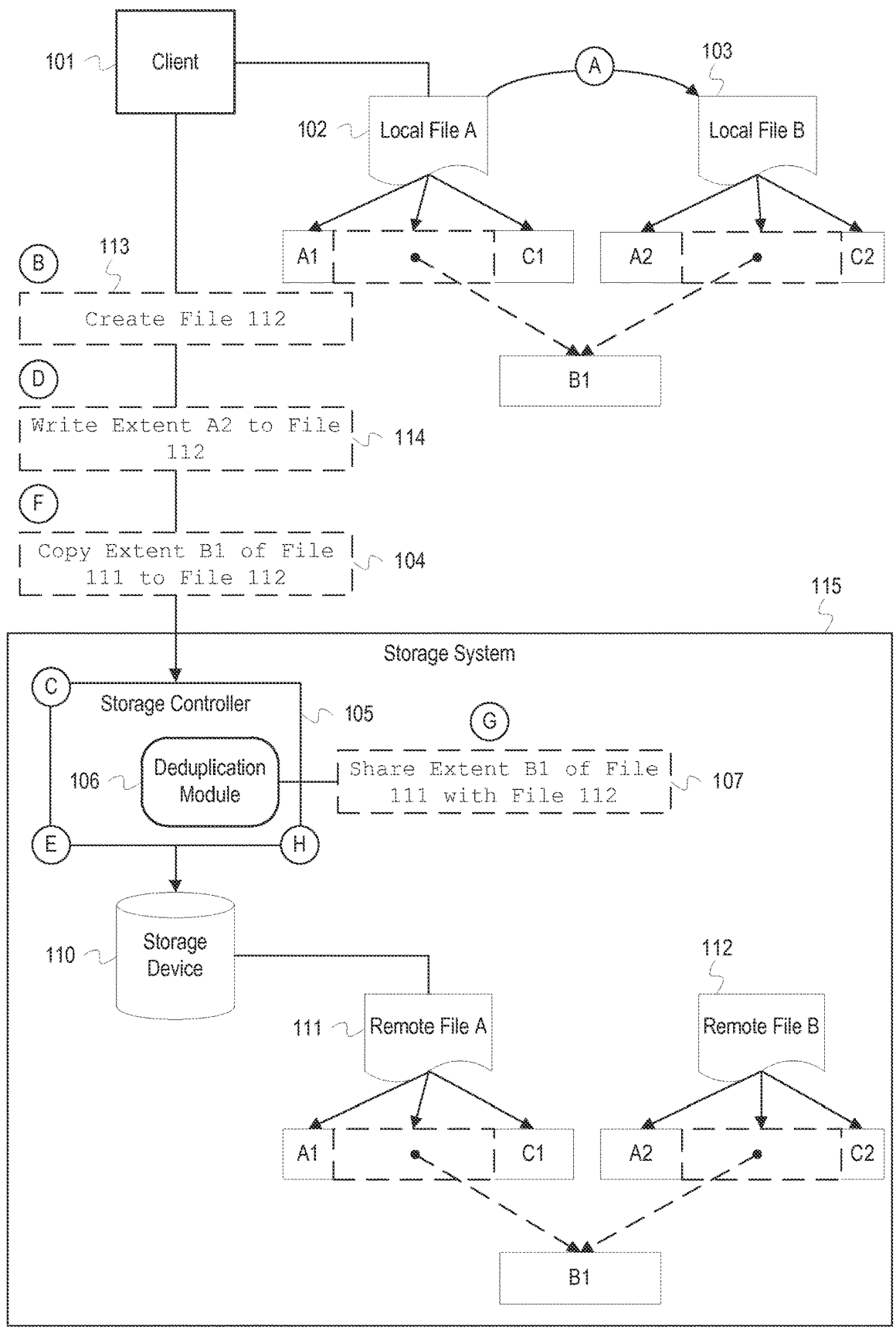
FIG. 1 depicts a storage system with a deduplication module that shares extents between files.

The description that follows includes example systems, methods, techniques, and program flows that embody aspects of the disclosure. However, it is understood that this disclosure may be practiced without these specific details. For instance, this disclosure refers to sharing extents between files in illustrative examples. But aspects of this disclosure can be applied to sharing contiguous or groups of blocked data in file systems that do not use extents. In other instances, well-known instruction instances, protocols, structures and techniques have not been shown in detail in order not to obfuscate the description.

INTRODUCTION

At the lowest level, the data associated with a file is stored in one or more blocks. Groups of contiguous blocks associated with a particular file can be grouped into extents, which can vary in size. Instead of maintaining the address of each individual block, the file can include a pointer to the first block of the extent and a count of the number of blocks in the extent. Additionally, files can include a hierarchy of pointer structures. For example, a root index node structure ("inode") associated with the file can include pointers to other inodes, to extents, or a combination thereof. To access data associated with the file, the pointer structures can be traversed until the appropriate data blocks are reached.

As part of data deduplication, a client may deduplicate extents. When deduplicating the extents, the client changes a pointer referencing one of the extents to reference the other extent. Thus, if the two original extents were associated with two different files, one of the extents is shared between the two files after deduplication. The client tracks and maintains shared extents locally, so when the deduplicated extent is created or backed up to a storage system, the client sends the extent instead of indicating that the extent is shared with another file. As a result, the extent may no longer be shared between the two files and may be duplicated. To prevent duplication, the client of the storage system can indicate shared extents between files to the storage system instead of sending the extent. The client can indicate a shared extent by sending a copy operation to cause the storage system to copy an extent from a source file already existing on the storage system to a new file. The storage system translates the copy operation and shares the extent indicated in the copy operation with the new file instead of performing the copy operation and duplicating the extent. Sharing extents on the storage system prevents multiple copies of the extents from being created. Instead, multiple files can share a single extent thereby increasing available storage space. Additionally, because the shared extent already exists on the storage system, the client does not send the extent data over the network, reducing network traffic.

Storage systems typically include multiple storage controllers and multiple storage devices. The storage controllers receive input/output ("I/O") commands from any number of clients. The I/O commands are generally specified as part of a protocol, such as the Common Internet File System (CIFS) or Network File System (NFS) protocols, implemented by compatible devices. The storage controllers process the I/O commands and send the I/O commands to the storage devices. The storage devices perform operations associated with the I/O commands and send responses back to the storage controllers. The storage controllers process the responses received from the storage devices and send responses to the clients. The I/O commands may also be remote procedure calls ("RPCs") or other forms of requests that cause a storage system to perform operations.

EXAMPLE ILLUSTRATIONS

FIG. 1 is annotated with a series of letters A-D. These letters represent stages of operations. Although these stages are ordered for this example, the stages illustrate one example to aid in understanding this disclosure and should not be used to limit the claims. Disclosures herein falling within the scope of the claims can vary with respect to the order and some of the operations.

FIG. 1 depicts a storage system with a deduplication module that shares extents between files. FIG. 1 depicts a client 101 and a storage system 115. The storage system 115 includes a storage controller 105, and a storage device 110. The storage controller 105 includes a deduplication module 106. The client 101 includes local file A 102 and local file B 103. The storage device 110 includes remote file A 111 and remote file B 112, which correspond to local file A 102 and local file B 103, respectively. FIG. 1 also depicts a copy operation 104 and a share operation 107.

The client 101 is a device such as a desktop computer, handheld device, server, etc., that is connected to the storage system 115. The client 101 may be connected to the storage system 115 locally or through a network, such as the Internet. The client 101 reads and writes data to and from the storage system 115 through communication with the storage controller 105. The storage controller 105 receives a request from the client 101 to perform an operation and processes the request. The storage controller 105 may forward the request to the storage device 110 to perform operations associated with the request. For example, the storage controller 105 may forward a request to the storage device 110 to read a specific block. The storage device 110 responds to the storage controller 105 by providing the block to the storage controller 105. The storage controller 105 then responds to the request of the client 101 by providing the block to the client 101. The commands or operations described above may be performed using a protocol such as NFS, CIFS, etc.

Prior to stage A, the client 101 reads remote file A 111 from the storage device 110 and creates the corresponding local file A 102. Local file A 102 can be stored in memory or on a storage device maintained by the client 101.

At stage A, the client 101 copies local file A 102 to create local file B 103 and writes extents A2 and C2 to local file B 103. Local file A 102 comprises extents A1, B1, and C1. In this example, the client 101 employs a redirect-on-write strategy. Thus, when the client 101 initially copies local file A 102 and creates local file B 103, local file B 103 includes a pointer to extents A1, B1, and C1. However, when modifications are made to either local file, new extents are written and the pointers to shared extents are changed to point to the new extents. In this example, client 101 writes extents A2 and C2 to local file B 103. Thus, local file B 103 no longer points to extents A1 and C1, instead pointing to extents A2 and C2. However, because client 101 has not modified extent B1, both local file A 102 and local file B 103 still point to extent B1.

At stage B, the client 101 sends a create operation 113 to the storage controller 105. The create operation 113 includes a file identifier, such as a file name or file path, and can include other file-related metadata, such as file size, date modified, or information related to a pointer structure.

At stage C, the storage controller 105 creates remote file B 112. To create remote file B 112, the storage controller 105 creates and writes metadata associated with the remote file B 112 to the file system. The metadata can be stored in memory on the storage controller 105 and/or can be written to the storage device 110. The metadata includes the file identifier. The storage controller 105 generates a file handle and sends the file handle back to the client 101. The file handle is another type of file identifier that the client 101 can use when referencing remote file B 112. Although the storage controller 105 creates the remote file B 112, the remote file B 112 only includes file-related metadata until the client 101 sends the actual file data to the storage controller 105, as described below.

At stage D, the client 101 sends a write operation 114 to the storage controller 105. The write operation 114 identifies the remote file B 112 and extent A2. The write operation also includes the data associated with extent A2. The remote file B 112 is typically identified using the file handle received from the storage controller 105 at stage C.

At stage E, the storage controller 105 adds extent A2 to the remote file B 112. To add extent A2 to the remote file B 112, the storage controller 105 allocates physical blocks on the storage device 110. The storage controller 105 then updates the metadata associated with remote file B 112. In particular, the storage controller 105 adds extent-related metadata to the file metadata. The extent-related metadata identifies the first block of data of the extent and the number of blocks of data in the extent. Additionally, if the first block of data of the extent is identified using a logical identifier (e.g., logical block address), the storage controller 105 adds an entry in a block map that maps the logical identifier to a physical identifier (e.g., physical block address) that specifies the location of the data on the storage device 110.

At stage F, the client 101 sends a copy operation 104 to the storage controller 105. The copy operation 104 may be an operation such as the NFS version 4 COPY RPC. The copy operation 104 identifies remote file A 111, remote file B 112, and extent B1. In some instances, the copy operation 104 includes a field (not depicted) that indicates the client's 101 intent that the extent B1 should be shared by the storage controller 105. Unlike the write operation 114, the copy operation 104 does not include the data for extent B1. Remote file A 111 and remote file B 112 are typically identified using file handles received by the client 101 from the storage controller 105. Extent B1 can be identified by indicating an offset and a length of extent B1 in remote file A 111. The offset indicates where extent B1 begins relative to the start of remote file A 111. The length of extent B1 is the number of blocks that make up the extent.

At stage G, the storage controller 105 identifies the copy operation 104 as a copy operation and passes the copy operation 104 to the deduplication module 106. The deduplication module 106 determines that a share may be performed and translates or converts the copy operation 104 into the share operation 107. The share operation 107 also indicates extent B1 but, when performed, causes extent B1 to be shared instead of copied. The deduplication module 106 translates the copy operation 104 to the share operation 107 by modifying the commands included with the copy operation 104. Normally, the copy operation 104 causes the storage controller 105 to allocate space for extent B1 in the remote file B 112 and copy extent B1 from remote file A 111 to the allocated space of remote file B 112. The share operation 107 instead causes the storage controller 105 to share extent B1 with remote file B 112, preventing the storage controller 105 from allocating space for extent B1 in remote file B 112.

At stage H, the storage controller 105 performs the share operation 107. The storage controller 105 updates the metadata associated with remote file B 112. In particular, the storage controller 105 adds extent-related metadata to the remote file B 112 metadata that identifies the first block of data of extent B1 in the remote file A 111 and the number of blocks of data in the extent. The storage controller 105 may also modify a pointer structure of the remote file B 112 to point to extent B1.

Similar operations to those described at stages D and E are performed by the client 101 and the storage controller 105 for extent C2. If remote file B 112 is read from the storage device 110, the extents A2, C2, and shared extent B1 are returned.

Figure 2:
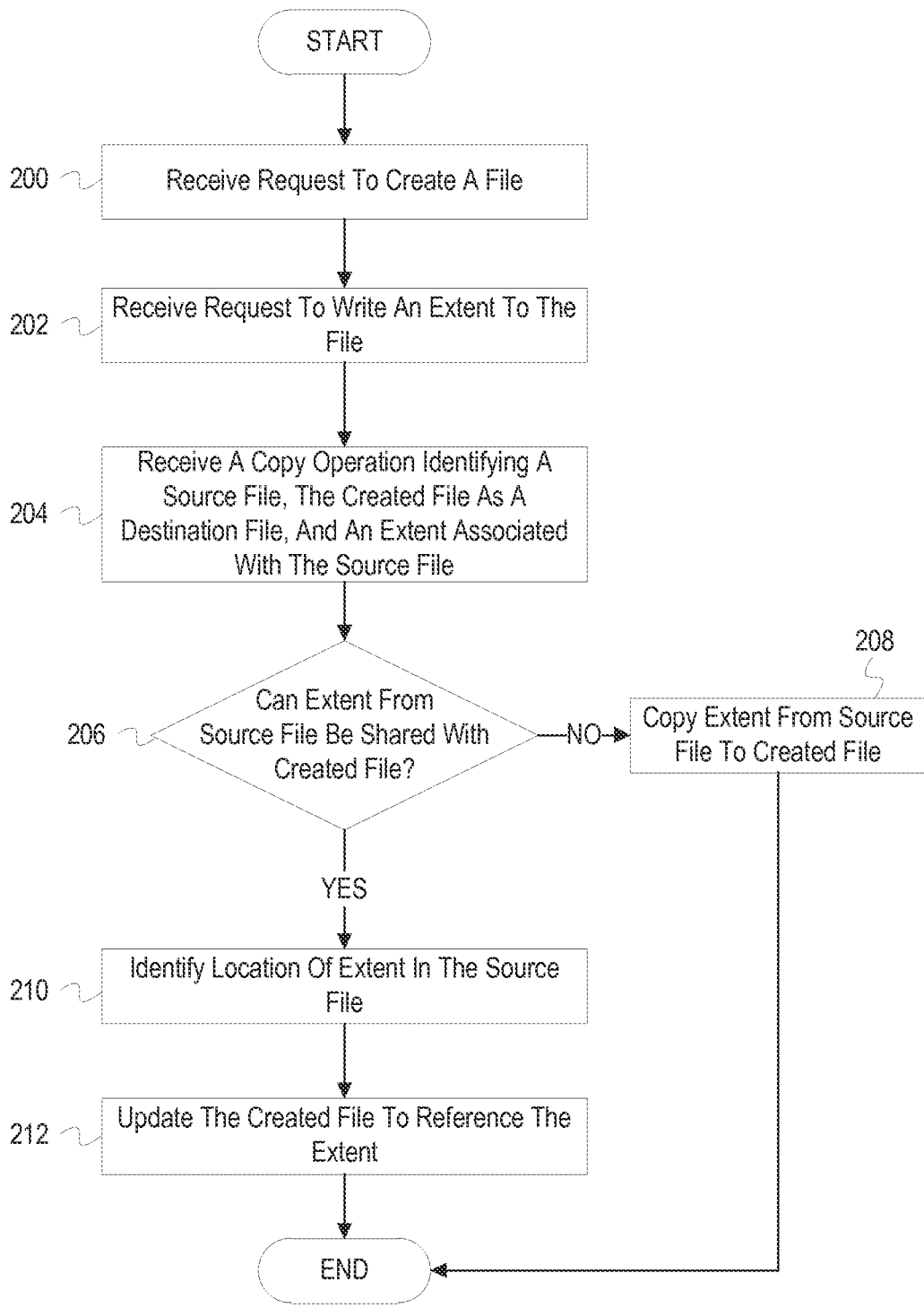
FIG. 2 depicts a flowchart of example operations for deduplicating a shared extent.

FIG. 2 depicts a flowchart of example operations for deduplicating a shared extent. The operations depicted in FIG. 2 can be performed by a storage controller such as the storage controller 105 of FIG. 1 or any suitable component.

At block 200, the storage controller receives a request to create a file. To create the file, the storage controller creates metadata associated with the file on a file system. The metadata can be stored in memory on the storage controller and/or can be written to a storage device. The metadata includes a file identifier received with the request. The storage controller generates a file handle and sends the file handle back to the requestor. The file handle can be used by the requestor and the storage controller to refer to and perform operations on the created file.

At block 202, the storage controller receives a request to write an extent to the file. The request includes the data associated with the extent to be written. To write the extent to the file, the storage controller allocates physical blocks on the storage device. The storage controller then updates the metadata associated with the file. In particular, the storage controller adds extent-related metadata to the file metadata. The extent-related metadata identifies the first block of data of the extent and the number of blocks of data in the extent. Additionally, if the first block of data of the extent is identified using a logical identifier (e.g., logical block address), the storage controller adds an entry in a block map that maps the logical identifier to a physical identifier (e.g., physical block address) that specifies the location of the data on the storage device.

At block 204, the storage controller receives a copy operation identifying a source file, the created file as a destination file, and an extent associated with the source file. Unlike the request to write an extent, the copy operation does not include data for an extent. Instead, the copy operation identifies an extent in a source file, typically identified using a file handle, to be copied to a destination file (the created file in this instance). The extent to be copied can be identified by indicating an offset and a length of the extent in the source file. The copy operation may also include an offset indicating the location in the created file to insert the copied extent. In some instances, the copy operation may include a field that indicates to the storage controller that a share operation should be performed if possible. For example, a flag in the copy operation may be set to indicate that the copy operation is intended to be a share operation. If the flag is not set, the storage controller may perform a copy operation as normal. If the flag is set, the storage controller determines whether the extent can be shared.

At block 206, the storage controller determines whether the extent from the source file can be shared with the created file. In some instances, the extent may not be shared with the created file. For example, if the source file for the extent is stored on a different storage volume than the created file, it may not be possible to create a pointer to the extent because the extent is not addressable, or it may be impractical for performance reasons to share the extent. Other conditions may prevent an extent from being shared, such as if an extent is marked for deletion or is corrupted. Additionally, in some instances, the storage controller determines that the extent cannot be shared if a field in the copy operation indicates that an extent is not intended to be shared. If the extent can be shared, control then flows to block 210. If the extent cannot be shared, control then flows to block 208.

At block 208, the storage controller copies the extent from the source file to the created file. Because the deduplication module determined that the extent cannot be shared, the received copy operation is performed instead of sharing the extent, i.e. the extent is copied from the source file to the created file. In instances where the extent cannot be shared because the extent is corrupt or cannot be copied, the storage controller indicates that the copy operation was not performed and may request data for the extent. After the extent is copied from the source file to the created file, the process ends.

At block 210, after the deduplication module determined that the extent can be shared, the storage controller identifies the location of the extent in the source file. As described above, the copy operation identifies the source file and the extent in the source file. The extent is indicated by an offset that indicates the location of the extent in relation to the beginning of the source file. The storage controller determines the location of the source file in the storage device and then identifies the location of the extent using the offset. The storage controller may then determine a logical identifier (e.g., logical block address) or a physical identifier (e.g., physical block address) that specifies the location of the extent on the storage device.

At block 212, the storage controller updates the created file to reference the extent. The storage controller updates the metadata associated with the file. In particular, the storage controller adds or modifies extent-related metadata in the file metadata that identifies the first block of data of the extent in the source file and the number of blocks of data in the extent. The metadata may be updated to include the logical identifier or physical identifier that was determined at block 210. Additionally, the storage controller may modify a pointer structure associated with the created file to point to the extent. After the storage controller updates the created file to reference the shared extent, the process ends.

Although the storage controller may perform one or more operations to determine whether an extent can be shared between a source and destination file (e.g., at block 206), the storage controller does not perform operations typical of inline deduplication, such as comparing a hash of the extent data to hashes stored in a fingerprint database. Instead, the storage controller effectively deduplicates the extent data based on information received from the requestor, thus avoiding the overhead associated with inline deduplication.

Figure 3:
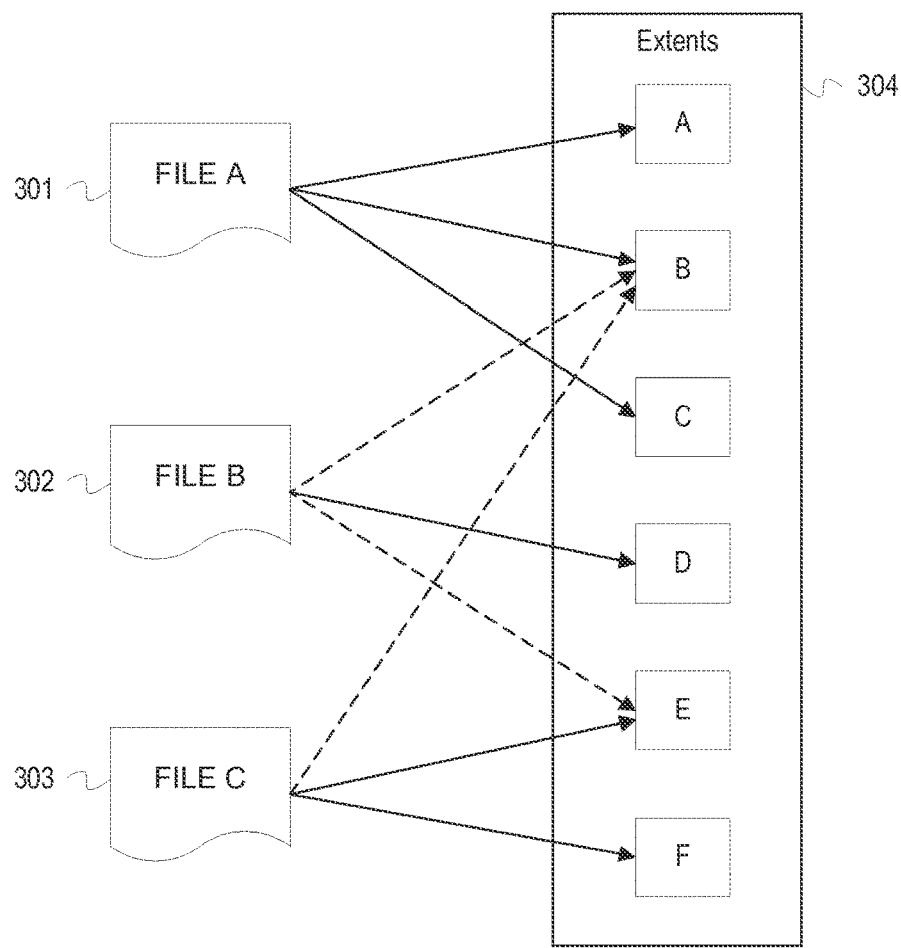
FIG. 3 depicts files with shared extents and an example table for monitoring shared extents.

FIG. 3 depicts files with shared extents and an example table for monitoring shared extents. FIG. 3 depicts file A 301, file B 302, and file C 303. FIG. 3 also depicts a set of extents 304 comprising extents A-F. The files and the set of extents 304 may be stored on a storage device such as the storage device 110 of FIG. 1. FIG. 3 also depicts a shared extent table 305 ("table 305").

In FIG. 3, a solid line between one of the files and one of the set of extents 304 indicates that the extent is original to the file, i.e. the file is the source of the extent. A dashed line between one of the files and one of the set of extents 304 indicates that the file points to the extent. File A 301 comprises extents A, B, and C. As indicated by the solid lines, file A 301 is the source file for extents A, B, and C. File A 301 does not share any extents. File B 302 is the source file for extent D and shares extents B and E. File C 303 is the source file for extents E and F and shares extent B.

The table 305 is maintained and used by a deduplication module to monitor shared extents. As depicted in FIG. 3, the table 305 includes four columns: "shared extent", "share counter", "source file", and "sharing files". The shared extent column includes an identifier for each shared extent. The identifier may comprise the file handle of the source file of the extent, an offset for the extent, and the length of the extent. The share counter column includes a count for the number of files, not including the source file, with which an associated extent is shared. The counter does not include a count for the source file of the extent because the extent is original to and thus not shared by the source file. The source file column includes the file handle for the file to which the extent belongs, i.e. the source file. The source file handle may be included in the identifying information for the shared extent, in which case this column may be omitted from the table 305. The sharing files column includes the file handles for each file that shares or points to the extent. The table 305 may have more or fewer columns depending on information maintained in the table.

The first row of the table 305 includes information for extent B of the set of extents 304. The table 305 includes identifying information for the extent in the shared extent column, which, for simplicity in this illustration, is simply the letter B. The share counter has been incremented to the value 2 because file B 302 and file C 303 share the extent. As indicated by the dashed lines, extent B is pointed to by the file B 302 and the file C 303. The source file column of the table 305 includes the file handle for the file A 301 indicating that the file A 301 is the source of extent B. Finally, the sharing files column includes the file handles for the file B 302 and the file 303 as these files share extent B.

The second row of the table 305 includes information for extent E of the set of extents 304. The table 305 includes the letter E for the identifying information in the first column. The share counter has a value of 1 as extent E is shared by the file B 302. The source file column includes the file handle for the file C 303. Finally, the shared file column includes the file handle for the file B 302.

Extents A, C, D, and F of the set of extents 304 are not included in the table 305 as these extents are not shared. Extents A, C, D, and F are only used by their respective source files. However, if a share operation is performed that causes one of these extents to be shared, the extent will be added to the table 305. Conversely, if one of the sharing files is deleted or an extent is no longer shared by any files, the extent will be removed from the table 305.

Figure 4:
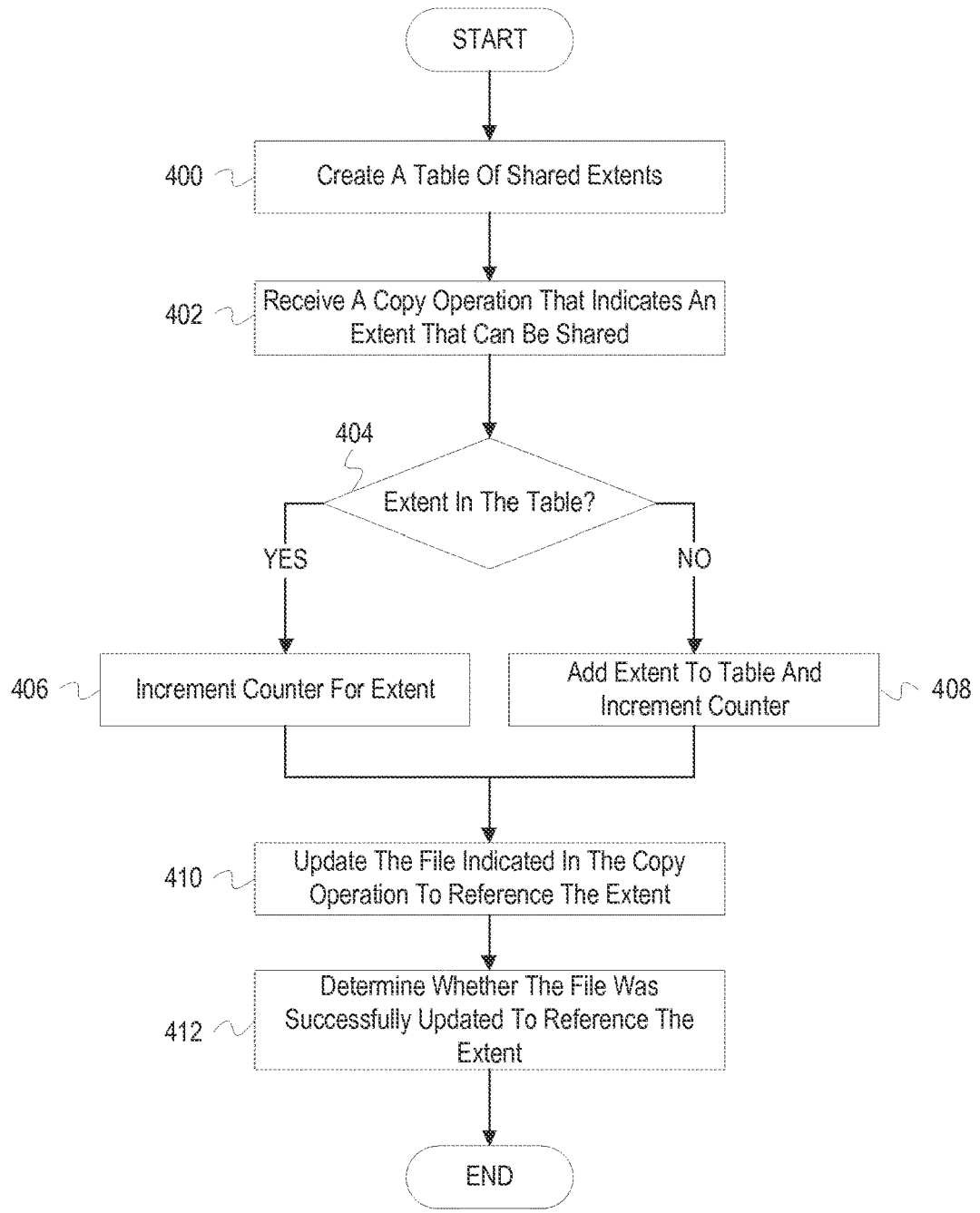
FIG. 4 depicts a flowchart of example operations for maintaining a counter for shared extents.

FIG. 4 depicts a flowchart of example operations for maintaining a counter for shared extents. The example operations depicted in FIG. 4 may be performed by a storage controller similar to the storage controller 105 of FIG. 1 or any suitable component. In some instances, one or more of the operations described in FIG. 4 may be performed by a deduplication module within, or separate from, the storage controller.

At block 400, a storage controller creates a table to monitor shared extents. The table includes shared extents and counters associated with each shared extent. The counters track the number of files, not including the source file, with which an associated extent is shared. For example, if an extent of a file is used by three other files besides the source file, the counter has a value of three. As discussed in more detail in FIG. 5, once the counter reaches zero, the extent is removed from the table of shared extents. Extents may also be indicated in the table using the file handle for the source file and an offset for the extent.

At block 402, the storage controller receives a copy operation that indicates an extent that can be shared. The storage controller determines an identifier for the extent. For example, the identifier may be the logical or physical identifier for the first block of the extent.

At block 404, the storage controller determines if the extent is in the table. The storage controller compares the identifier for the extent to entries in the table to determine if an entry for the extent already exists. If the extent is in the table of shared extents, control then flows to block 406. If the extent is not in the table of shared extents, control then flows to block 408.

At block 406, the storage controller increments a counter associated with the extent. The counter associated with the extent is incremented to indicate that an additional file is or will be sharing the extent.

At block 408, after the storage controller determined the extent was not in the table, the storage controller adds the extent to the table of shared extents. A new entry in the table is created for the extent and a counter in the entry is incremented to one. The counter is incremented to indicate that the extent is shared by one file. The identifier for the extent is added to the created entry. Additionally, other information related to the extent may be added to the table as well, such as the file handles for the source file and the file(s) sharing the extent.

At block 410, the storage controller updates a file indicated in the copy operation to reference the extent. The storage controller updates the file in a manner similar to that described at block 212 of FIG. 2.

At block 412, the storage controller determines whether the file was successfully updated to reference the extent. If the storage controller determines that the file was not successfully updated, the storage controller will decrement the counter associated with the extent. If the storage controller determines that the file was successfully updated, the storage controller does not change the counter value, as the counter has already been incremented for the share operation. After the storage controller has determined whether the file was successfully updated, the process ends.

The counter may not be incremented until the storage controller determines that the share operation was successful. In which case, the counter is not incremented at block 406 or block 408 but is instead incremented once the deduplication module received an indication that the file was successfully updated to reference the extent, i.e. the extent has been shared.

Figure 5:
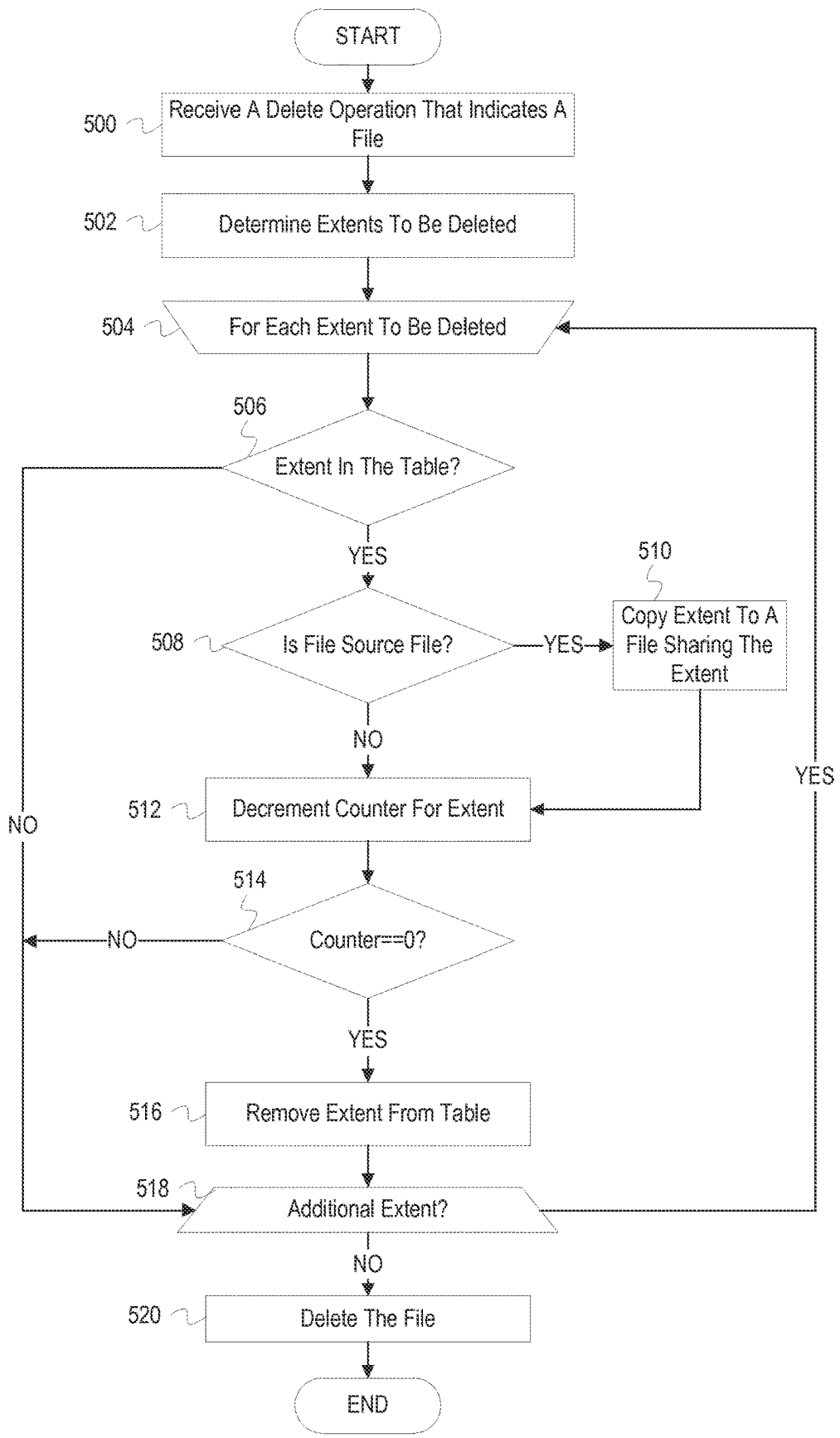
FIG. 5 depicts a flowchart of example operations for maintaining a shared extents table in response to a delete operation.

FIG. 5 depicts a flowchart of example operations for maintaining a shared extents table in response to a delete operation. The example operations depicted in FIG. 5 may be performed by a storage controller similar to the storage controller 105 of FIG. 1 or any suitable component. In some instances, one or more of the operations described in FIG. 5 can be performed by a deduplication module within, or separate from, the storage controller.

At block 500, a storage controller receives a delete operation that indicates a file. The delete operation indicates a file to be deleted, marked for deletion, or freed.

At block 502, the storage controller determines the extents to be deleted. The storage controller analyzes the indicated file to determine the extents to be deleted as part of deleting the file. If a file contains a pointer to an extent of another file, the extent from the other file will be included as an extent to be deleted (even though the data of the extent will not be deleted). The storage controller determines identifiers for the extents that may be used to identify the extents in a table of shared extents. The storage controller also determines an identifier for the file to be deleted to be used to determine if the file is a source file for a shared extent.

At block 504, a loop for each of the extents to be deleted begins.

At block 506, the storage controller determines if the extent is in the table of shared extents. The storage controller may search the table using an identifier for the extent. If the extent is not in the table, control then flows to block 518. If the extent is in the table, control then flows to block 508.

At block 508, after the storage controller determined the extent was in the table, the storage controller determines whether the file to be deleted is the source file for the extent. The table may include the file handle for the source file of the extent. Additionally, the storage controller may analyze the file, the file's metadata, the data for the file, etc., to determine whether the file is the source file for the extent. If the file is not the source file for the extent, control then flows to block 512. If the file is the source file for the extent, control then flows to block 510.

At block 510, the storage controller copies the extent to a file sharing the extent. Because the file to be deleted is the source file for the extent, the extent is copied so that other files that share the extent do not lose the data contained in the extent when the file is deleted. If the file is not a source file, then the extent does not need to be copied as the data for the extent will not be deleted or freed upon deletion of the file. The extent may be copied to another location on a storage device or may be copied to a file that is currently sharing the extent. If the extent is copied to a file sharing the extent, the file sharing the extent becomes the new source file for the extent. If additional files share the extent, the pointers in the additional files are updated to point to the extent's new location, or the metadata of the additional files is updated to reference the extent's new location. Alternatively, instead of copying the extent, the storage controller may indicate that the extent should not be deleted.

At block 512, after the extent was copied or after the storage controller determined the file is not a source file, the storage controller decrements the counter corresponding to the extent. The storage controller identifies an entry in the table associated with the extent to be deleted and decrements the counter for the entry. The counter is decremented because one less file will share the extent. If the storage controller determined that the file was not a source file for the extent, then one less file will share the extent because a file sharing the extent will be deleted. If the storage controller determined that the file was a source file for the extent, then one less file will share the extent because a file sharing the extent has become a source file for the extent as a result of the operations at block 510.

At block 514, the storage controller determines if the counter corresponding to the extent is equal to zero. The counter is the counter associated with the extent that was decremented at block 512. If the counter is equal to zero, control then flows to block 516. If the counter is not equal to zero, control then flows to block 518.

At block 516, the storage controller removes the extent from the table of shared extents. If the counter for an extent is equal to zero, then the extent is only used by the source file and no other files share the extent. As a result, the extent is removed from the table.

Control flowed to block 518 if it was determined at 506 that the extent was not in the table of shared extents, if the counter for the extent was not equal to zero, or after the extent was removed from the table. At block 518, the storage controller determines if there is an additional extent to be deleted. If there is an additional extent to be deleted, control then flows to block 504. If there is not an additional extent to be deleted, then control flows to block 520.

At block 520, the storage controller deletes the file. The storage controller has updated the shared extents table and has made copies of any shared extents that may be deleted. As a result, it is safe for the storage controller to delete the file and its associated extents. Alternatively, the storage controller may mark the file for deletion or free the storage space where the file resides. After the file is deleted, the process ends.

Variations

Although FIG. 1 depicts a single client backing files to a single storage system, this depiction is provided as a first example illustration and should not be used to limit scope of the claims. Different entities that can share data across files (e.g., application instances, virtual machines, etc.) can determine duplicate extents and request a storage controller to share extents accordingly. The different entities can also perform local deduplication across files of the different entities and request a storage controller to remotely share extents in accordance with the local, coordinated deduplication. In either the case of determining duplicates without deduplication or local deduplication, the different entities coordinate to send a request or command to the storage controller.

As an example, multiple virtual machines ("clients") running on multiple devices (e.g., servers) can coordinate with each other with a shared structure of data fingerprints. The shared data fingerprint structure can be on a shared attached storage or be maintained in synchronized copies accessible by the multiple virtual machines. The file sets maintained/accessed by the virtual machines are backed to a remote storage device(s). Assume file A of virtual machine A shares a first extent with file B of virtual machine B. In addition, file A of virtual machine A shares a second extent with file C of virtual machine C. When a triggering event occurs (e.g., a snapshot operation, an archive operation, a maintenance operation, etc.), a request is sent to a storage controller that currently manages access to the remote storage device backing the file sets. Since two extents are shared, two different requests (e.g., the COPY operation described above) identifying the different extents are sent to the storage controller. Which of the virtual machines generates the request depends upon an implementing technique. When different entities coordinate, one of the entities can be selected or elected to be the source of share requests to a storage controller. This selection/election can be based on available resources of the entities, entity with the most shared extents, entity with the least workload, permissions defined for the entity, etc. As another technique, the deduplication "source" entity or client can be designated as the request creator. Using the example of the virtual machines, file A can be the donor or source file for the shared first extent and for the shared second extent. Thus, virtual machine A can generate both requests. Virtual machine A will generate a first COPY remote procedure call, for example, that requests copying of the first extent from file A to file B within the backing storage. The virtual machine A will generate a second COPY remote procedure call that requests copying of the second extent from file A to file C in the backing storage. As already described, the storage controller will perform share operations instead of a copy operation in response to the COPY remote procedure calls.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 204-212 of FIG. 2 may be performed multiple times, in parallel, or concurrently if multiple copy operations are received at a storage controller. Additionally, a storage controller might receive a request to copy a file without receiving a request to write extents to a newly created file (block 202). It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

Some operations above iterate through sets of items, such as extents. The number of iterations for loop operations may vary. Different techniques for updating a table of shared extents may require fewer iterations or more iterations. For example, the loop beginning at block 504 in FIG. 5 may not iterate for each of the extents to be deleted. The loop may not iterate over an extent that is corrupt or may not iterate over an extent for which an identifier could not be determined. Additionally, the loop may exit due to error conditions or other factors.

Although the description above describes deduplicating an extent between a single client and a single storage system, deduplicating an extent can occur across more than two systems. For example, a storage controller may manage a storage device and a backup of the storage device. The storage controller may deduplicate the extent across the storage device and the backup. As an additional example, a client may send a copy operation to multiple storage systems which each deduplicate an extent on their respective storage devices in response to receiving the copy operation.

In the description above, a client sends a copy operation to cause a storage controller to share an extent between a source file and a destination file. In some variations, different operations may also cause an extent to be shared. For example, a client may explicitly send a share operation instead of sending a copy operation that is translated into a share operation. Additionally, a client may send commands that cause the storage controller to update the destination file to reference the shared extent.

The table of shared extents described in FIGS. 3, 4, and 5 includes a counter that counts the number of files which share an extent associated with the counter. The counter is described as not including a count for the source file from which the extent originates. However, in some variations, the counter may include a count for the source file. In such variations, when the counter reaches zero, the extent is removed from the table as indicated at block 516 of FIG. 5. Additionally, the extent on a storage device is freed.

A copy operation received by a storage controller is described as indicating a single extent. A copy operation may indicate multiple extents to be shared with an indicated file. The operations of blocks 206, 208, 210, and 212 described in FIG. 2 may be repeated to account for each additional extent indicated in a received copy operation.

As described above, an extent might not be shared if the source and destination files are on different volumes. A volume is an example of a storage object. Storage objects may be physical or logical grouping of data. Other examples of storage objects include partitions, RAID (Redundant Array of Inexpensive Disks or Redundant Array of Independent Disks) group, individual storage devices, etc. Whether extents can be shared between storage objects can vary depending on the particular capabilities of the storage system.

The description above refers to sharing extents between files. However, the operations described above can be applied to various data units. For example, data blocks, words, or segments may be shared.

The variations described above do not encompass all possible variations, aspects, or features of the present disclosure. Other variations, modifications, additions, and improvements are possible.

Some aspects of the examples above are simplified in order not to obfuscate the description of the disclosures. For example, although the examples describe a storage controller writing data to a storage device, the storage controller might write the data across multiple storage devices. For example, data related to a particular file might be spread across multiple storage devices for redundancy purposes. Relatedly, writing data to one or more storage devices might also include generating parity data and writing the parity data to the storage devices (or different storage devices). Additionally, the process of writing data to a storage device might be more complex. For example, a storage controller might "commit" a change to data (including file system related metadata) by writing it into a non-volatile cache located on the storage controller. Periodically, the data in the non-volatile memory can be flushed to the storage device(s). Thus, when the examples above describe writing data to a storage device, the associated operations encompass writing the data into a non-volatile cache (or similar technique) instead of writing it directly to the storage device.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium does not include transitory, propagating signals.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
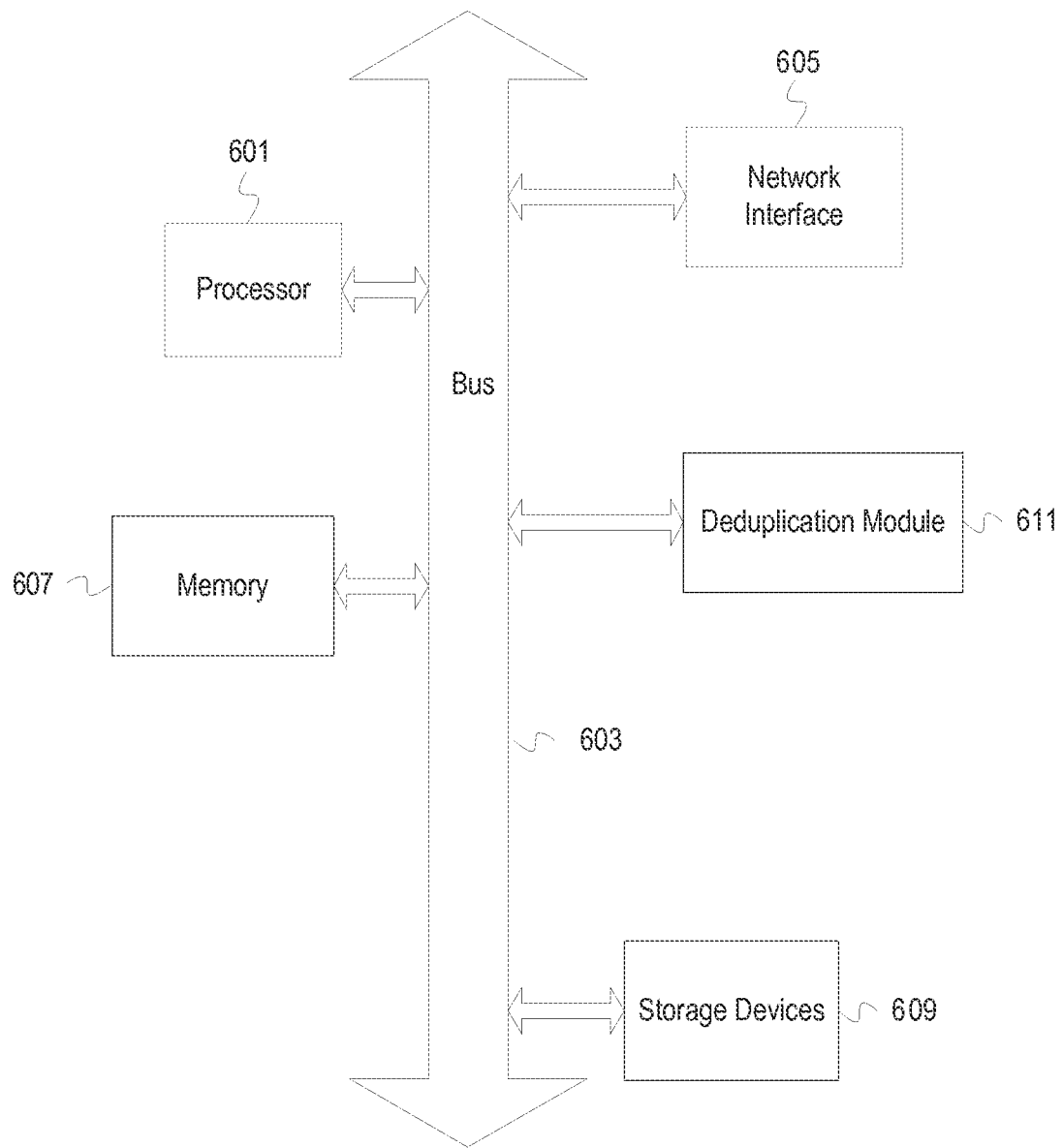
FIG. 6 depicts an example computer system with a deduplication module.

FIG. 6 depicts an example computer system with a deduplication module. The computer system includes a processor 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, Hyper-Transport® bus, InfiniBand® bus, NuBus, etc.) and a network interface 605 (e.g., a Fiber Channel interface, an Ethernet interface, an internet small computer system interface, SONET interface, wireless interface, etc.). The system also includes the deduplication module 611. The deduplication module 611 shares extents between files on a storage system. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

While the aspects of the disclosure are described with reference to various aspects and exploitations, it will be understood that these aspects are illustrative and that the scope of the claims is not limited to them. In general, techniques for sharing extents as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

What is claimed is:

1. A method comprising:
executing a create file operation, received from a client device that maintains a first local file and a second local file, to create a first remote file within a storage system to correspond to the first local file;
writing a first extent, received from the client device, into the first remote file based upon the first local file comprising the first extent and the second local file lacking the first extent;
receiving a copy operation from the client device for a second extent of the first local file;
evaluating the copy operation to identify an indicator, included within the copy operation by the client in place of data associated with the second extent, that the first local file and the second local file share the second extent, wherein the storage system maintains a second remote file corresponding to the second local file, and wherein the indicator comprises a field specifying that the storage system is to share the second extent and triggers a conversion of the copy operation into a sharing operation by modifying a command within the copy operation; and
performing the sharing operation to share the second extent of the second remote file with the first remote file and prevent the storage system from allocating space for the second extent within the first remote file, resulting in a single instance of the data of the second extent being stored and shared by the first and second remote files.

2. The method of claim 1, wherein the storage system maintains the first remote file as a first replica of the first local file maintained by the client device and the second remote file as a second replica of the second local file maintained by the client device.

3. The method of claim 1, wherein the sharing operation causes the storage system to create extent-related metadata for the first remote file to reference the data of the second extent stored by the storage system for the second remote file.

4. The method of claim 1, wherein the indicator indicates that the second extent is shared by the first local file and the second local file by the client device, such that the second extent should be shared by the first remote file and the second remote file by the storage system.

5. The method of claim 4, wherein the indicator indicates that the second extent is deduplicated between the first local file and the second local file by the client device, such that the second extent should be deduplicated by the storage system between the first remote file and the second remote file.

6. The method of claim 1, comprising:
evaluating the indicator of the copy operation to identify a location and size of the second extent.

7. A non-transitory machine readable medium comprising instructions for performing a method, which when executed by a machine, causes the machine to:
execute a create file operation, received from a client device that maintains a first local file and a second local file, to create a first remote file within a storage system to correspond to the first local file;
write a first extent, received from the client device, into the first remote file based upon the first local file comprising the first extent and the second local file lacking the first extent;
receive a copy operation from the client device for a second extent of the first local file;
evaluate the copy operation to identify an indicator, included within the copy operation by the client in place of data associated with the second extent, that the first local file and the second local file share the second extent, wherein the storage system maintains a second remote file corresponding to the second local file, and wherein the indicator comprises a field specifying that the storage system is to share the second extent and triggers a conversion of the copy operation into a sharing operation bar modifying a command within the copy operation; and
perform the sharing operation to share the second extent of the second remote file with the first remote file and prevent the storage system from allocating space for the second extent within the first remote file, resulting in a single instance of the data of the second extent being stored and shared by the first and second remote files.

8. The non-transitory machine readable medium of claim 7, wherein the storage system maintains the first remote file as a replica of the first local file maintained by the client device.

9. The non-transitory machine readable medium of claim 7, wherein the storage system maintains the second remote file as a replica of the second local file maintained by the client device.

10. The non-transitory machine readable medium of claim 7, wherein the indicator indicates that the second extent is shared by the first local file and the second local file by the client device, such that the second extent should be shared by the first remote file and the second remote file by the storage system.

11. The non-transitory machine readable medium of claim 10, wherein the indicator indicates that the second extent is deduplicated between the first local file and the second local file by the client device, such that the second extent should be deduplicated by the storage system between the first remote file and the second remote file.

12. The non-transitory machine readable medium of claim 7, wherein the instructions cause the machine to:
evaluate the indicator of the copy operation to identify a location and size of the second extent.

13. The non-transitory machine readable medium of claim 7, wherein the indicator indicates that the second extent is to be shared across remote files maintained by the storage system.

14. The non-transitory machine readable medium of claim 7, wherein the instructions cause the machine to:
convert the copy operation into the sharing operation based upon the copy operation comprising the indicator.

15. A computing device comprising:
a memory comprising machine executable code for performing a method; and
a processor coupled to the memory, the processor configured to execute the machine executable code to cause the processor to:
execute a create file operation, received from a client device that maintains a first local file and a second local file, to create a first remote file within a storage system to correspond to the first local file;
write a first extent, received from the client device, into the first remote file based upon the first local file comprising the first extent and the second local file lacking the first extent;
receive a copy operation from the client device for a second extent of the first local file;
evaluate the copy operation to identify an indicator, included within the copy operation by the client in place of data associated with the second extent, that the first local file and the second local file share the second extent, wherein the storage system maintains a second remote file corresponding to the second local file, and wherein the indicator comprises a field specifying that the storage system is to share the second extent and triggers a conversion of the copy operation into a sharing operation by modifying a command within the copy operation; and
perform the sharing operation to share the second extent of the second remote file with the first remote file and prevent the storage system from allocating space for the second extent within the first remote file, resulting in a single instance of the data of the second extent being stored and shared by the first and second remote files.

16. The computing device of claim 15, wherein the storage system maintains the first remote file as a replica of the first local file maintained by the client device.

17. The computing device of claim 15, wherein the storage system maintains the second remote file as a replica of the second local file maintained by the client device.

18. The computing device of claim 15, wherein the indicator indicates that the second extent is shared by the first local file and the second local file by the client device, such that the second extent should be shared by the first remote file and the second remote file by the storage system.

* * * * *